United States Patent [19]

Urai

[11] Patent Number: 4,561,917
[45] Date of Patent: Dec. 31, 1985

[54] METHOD OF MAKING A CUSHION BODY OF SYNTHETIC RESIN

[75] Inventor: Muneharu Urai, Akishima, Japan

[73] Assignee: Tachikawa Spring Co., Ltd., Akishima, Japan

[21] Appl. No.: 628,144

[22] Filed: Jul. 5, 1984

[51] Int. Cl.⁴ .................... B29C 65/08; B32B 31/20
[52] U.S. Cl. .................................. 156/73.1; 156/219; 156/290; 156/300; 156/308.4; 264/23
[58] Field of Search ............... 156/73.1, 580.1, 580.2, 156/219, 290, 300, 308.4; 264/23; 428/99, 100

[56] References Cited

U.S. PATENT DOCUMENTS

| | | | |
|---|---|---|---|
| 3,525,376 | 8/1970 | Muhlhauser | 428/100 |
| 4,157,719 | 6/1979 | DeWoskin | 156/290 |
| 4,293,355 | 10/1981 | Wacker | 264/23 |
| 4,393,116 | 7/1983 | Taylor | 156/73.1 |

*Primary Examiner*—Michael Wityshyn
*Attorney, Agent, or Firm*—Oldham, Oldham & Weber Co.

[57] ABSTRACT

Disclosed is a method of making a cushion body of synthetic resin with an ultrasonic welder. Ultrasonic heating and welding permits the formation of laminated synthetic resin material into a desired ornamental shape without causing any shearing effect therein.

3 Claims, 17 Drawing Figures

METHOD OF MAKING A CUSHION BODY OF SYNTHETIC RESIN

BACKGROUND OF THE INVENTION

This invention relates to a method of making a cushion body of polyurethane and other synthetic resins.

Such cushion bodies have been widely used as, for instance, seat cushions and decorative panels applied to the interior of an automobile.

FIGS. 1 to 4 show prior art examples of synthetic resin cushion bodies. Particularly FIG. 1 shows, in section, a synthetic resin cushion body as comprising a surface layer 1 of, for instance, artificial leather and a filler pad of foamed polyurethane 2. As shown, the surface layer and the underlying filler pad are welded together at discrete positions 2a (five positions in this particular example). A filler pad may be of thin-skinned polyurethane or skinless polyurethane. The former is a polyurethane coated with a mold separating agent, which is ordinarily used in foaming the material, whereas the latter is a polyurethane molded at a relatively low temperature, thus causing no skin coating.

FIG. 2 shows the manner in which the surface layer 1 and the filler pad 2 are locally welded together. Specifically, the surface layer 1 is laid on the filler pad 2, and the two-layer body is sandwiched between two opposite plates 13 and 14 for dielectric heating. As shown, the upper dielectric heating plate 13 has a plurality of projections of same width "t" but different heights, whereas the lower dielectric heating plate 14 has no projections. (FIG. 2 shows the dielectric heating plates and the lamination sandwiched therebetween in the upside-down relation with their actual position in dielectric heating.) In dielectric heating, the two-layer body is compressed between the upper and lower plates, and then the elastic body yieldingly allows the projections of the lower plate 13 to invade the elastic body. An electric field of high frequency is applied across the thickness of the dielectric body to generate heat at discrete welding portions 2a, thereby melting the foamed material in the selected channels each "t" width. Then, the portions of the elastic body adjacent to the selected channels tend to return to their original stress-free shape, thus separating the foamed material from the opposite sides (shearing sides) 2b of each weld channel. Thus, the two-layer body when removed from the dielectric heating plates, is often found to be cut along each weld channel. Therefore, the dielectric heating is not appropriate for the purpose of welding a surface layer to an underlying filler pad.

In an attempt to avoid such shearing effect in the filler pad it has been proposed that a filler pad 2 is impregnated with a welding agent in selected channels across the thickness of the filler pad. The welding agent has a melting point below the melting temperature of polyurethane. A surface layer 1 is laid on the upper surface of the so-impregnated filler pad 2, and a backing layer 3 is laid on the lower surface of the filler pad. Then, the three-layer body is subjected to dielectric heating so that the filler pad 2 is welded under heat both to the overlying and underlying layers at the selected welding portions 2a of the filler pad, as shown in FIG. 3. In this case the filler pad 2 is compressed at discrete welding portions 2a in opposite directions. Thus, the resultant thickness "h" of the three-layer body is decreased as compared with the thickness "H" of the two-layer body of FIG. 1. Accordingly the cushion body is stiff somewhat, losing a pleasing voluminous appearance. Still disadvantageously, the production cost increases because of extra step of impregnation.

FIG. 4 shows a two-layer body as comprising a surface layer 1 and a filler pad 2 welded to the surface layer 1 at discrete portions 2a. This cushion body has no backing layer 3, and therefore the surface layer 1 cannot be corrugated or pleated as deeply as in the cushion body of FIG. 3. This is not appropriate for the purpose of giving a pleasing appearance to the surface of the cushion body. Disadvantageously the thin skin of the filler pad 2 welded under heat or glued to the surface layer 1, is liable to peel off from the filler pad, thus separating the surface layer from the filler pad. Fixing a filler pad to an overlying surface layer with the aid of a welding agent impregnated or otherwise applied to the filler pad or with the aid of a glue applied to the filler pad or to the surface layer disadvantageously increases the number of production steps, and hence the cost of production. Still disadvantageously, the resultant cushion body has a less pleasing appearance.

OBJECTS AND SUMMARY OF THE INVENTION

The object of this invention is to provide a method of making a cushion body of pleasing appearance guaranteed free of such drawbacks as mentioned above.

To attain this object a method of making a cushion body of a synthetic resin according to this invention uses an ultrasonic heating and welding horn for welding a filler pad under heat to an overlying surface layer while pressing the layer body into a final decorative shape.

BRIEF DESCRIPTION OF THE DRAWINGS

Preferred embodiments of the present invention will now be described in detail with reference to the accompanying drawings, in which.

DESCRIPTION OF THE PREFERRED EMBODIMENTS

Refering now to FIGS. 5-11 there are shown a variety of cushion bodies produced according to this invention.

Figure 1:
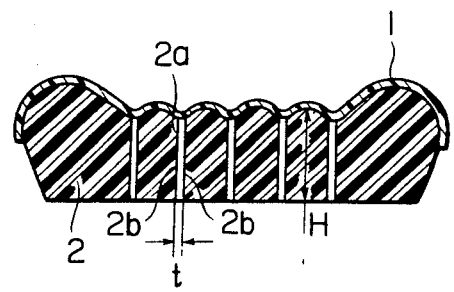
FIG. 1 is a schematic sectional view of a prior art cushion body.
Figure 2:
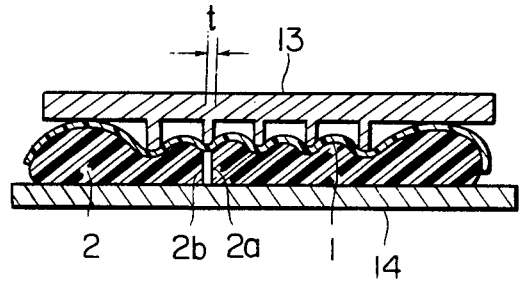
FIG. 2 is a schematic sectional view of the prior art cushion body sandwiched between opposite dielectric heating plates.
Figure 5A:
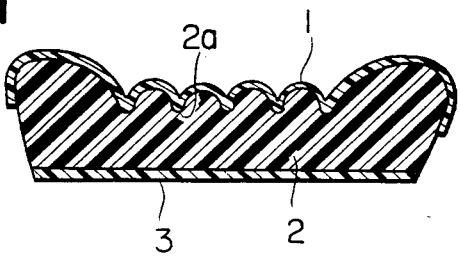
FIGS. 5a and 5b are schematic sectional views of first examples of cushion bodies with or without a wadding between a surface layer and a filler pad made according to this invention.

Particularly FIG. 5a shows a seat cushion comprising a surface layer 1, a filler pad 2 and a backing layer 3 in the order named. The surface layer 1 is corrugated or pleated and ultrasonic-heated and welded to the underlying filler pad 2. The cushion body has no shearing channels 2b which would appear if the layer body were subjected to dielectric heating as is the case with FIG. 1. The pleats along the welding seams 2a are so deep that the welding seams 2a are invisible, presenting a pleasing voluminous appearance. The deep welding seams 2a cause the surface layer 1 to apply an increased pressure to the underlying filler pad 2, and then the filler pad 2 is stiffened at selected areas. This presents a comfortable feeling to a person sitting thereon.

Figure 5B:
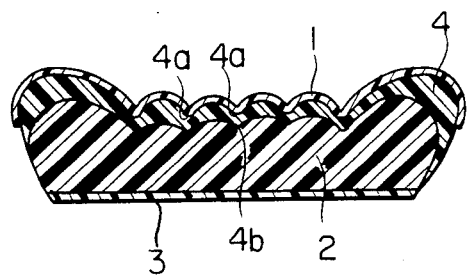

FIG. 5b shows a cushion body as comprising a surface layer 1, a wadding 4, a filler pad 2 and a backing layer 3 in the order named. The wadding 4 is ultrasonic-heated and welded to the overlying surface layer 1 along the welding seams 4a whereas the filler pad 2 is ultrasonic-heated and welded to the overlying wadding 4 along the welding seams 4b. The cushion body has no shearing channels 2b which otherwise, would appear in the filler pad and the wadding. The increased depth of pleats along the welding seams causes the surface layer 1 to apply an increased pressure to the underlying wadding 4 and filler pad 2, thus stiffening the cushion body at selected areas and giving a pleasing voluminous appearance and a comfortable stiffness to a person sitting thereon. This advantageous effect is caused in the remaining examples of cushion bodies produced according to this invention. The backing layer 3 may be glued to the bottom of the filler pad, or may be formed in foaming the filler pad material. Also, it should be noted that the ultrasonic welding begins with the portion of foamed polyurethane body to which the horn of an ultrasonic welder is applied under pressure, extending deep in the thickness of the foamed polyurethane.

Figure 6A:
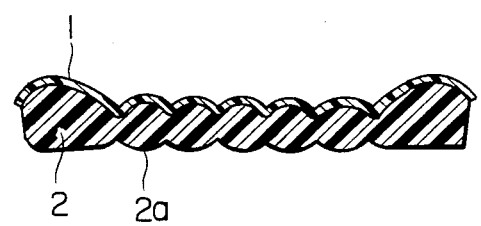
FIGS. 6a and 6b are schematic sectional views of second examples of cushion bodies with or without a wadding between a surface layer and a filler pad, made according to this invention.

FIG. 6a shows a two-layer cushion body as comprising a surface layer 1 and an underlying filler pad 2 ultrasonic-welded under heat to the overlying surface layer 1 at discrete welding portions 2a. As shown, the surface layer 1 is corrugated or pleated in the same fashion as that of the cushion body of FIG. 3, and the cushion body of FIG. 6a corresponds to the upper half of the cushion body taken along the line A—A in FIG. 3, thus saving the material of the lower half. Likewise, a three-layer cushion body of FIG. 6b, although having an extra wadding 4 between the surface layer 1 and the filler pad 2, corresponds to the upper half of the cushion body taken along the line A—A in FIG. 3, thus saving the material of the lower half.

Figure 3:
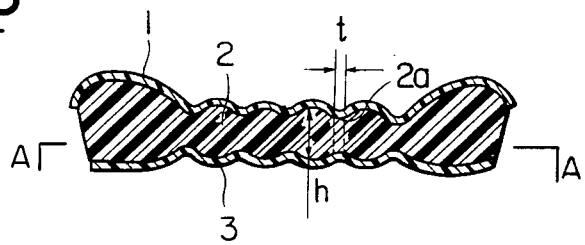
FIG. 3 is a schematic sectional view of another prior art cushion body.
Figure 4:
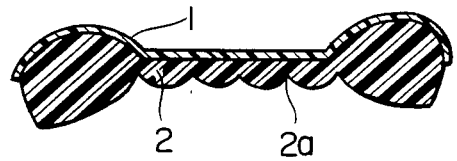
FIG. 4 is a similar view of still another prior art cushion body.
Figure 6B:
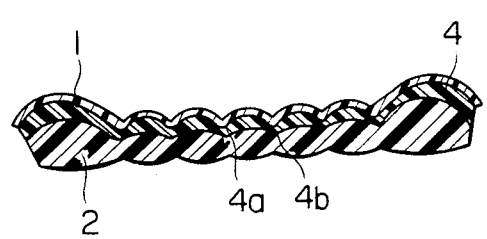

The cushion bodies of FIGS. 6a and 6b have no backing layer 3 as is the case with the cushion body of FIG. 3, but the cushion bodies of FIGS. 6a and 6b have a pleated surface layer 1, thereby presenting a pleasing appearance.

Figure 7A:
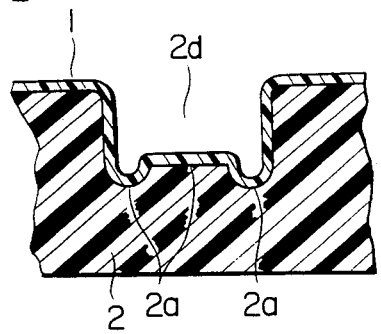
FIGS. 7a and 7b are schematic sectional views of parts of third examples of cushion bodies with or without a wadding between a surface layer and a filler pad, made according to this invention.
Figure 7B:
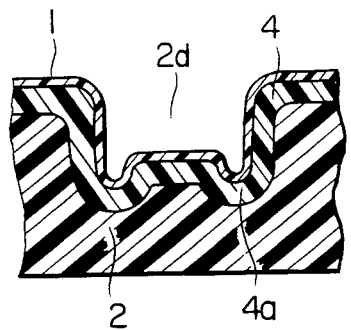

FIGS. 7a and 7b show embossed cushion bodies. When deep recesses 2d are desired in the surface of the cushion body for the purpose of decoration, such recesses can be performed in a polyurethane mold. Otherwise, ultrasonic heating and welding is performed on a layer body at selected areas so that deep recesses 2d are made. Then, the shape of each recess corresponds to that of the ultrasonic welder horn.

Figure 8:
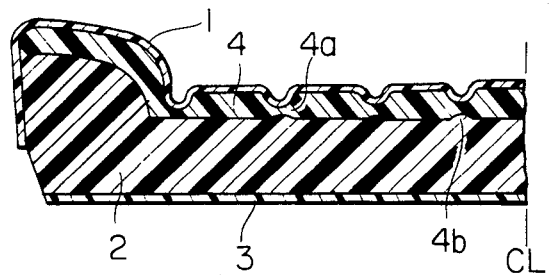
FIG. 8 is a schematic sectional view of a part of a fourth example of cushion body made according to this invention.

FIG. 8 shows a four-layer cushion body as comprising a surface layer 1, a wadding 4, a filler pad 2 and a backing layer 3 in the order named. Specifically, the surface layer 1 is ultrasonic-heated and welded to the underlying wadding 4 at discrete welding portions 4a, and the wadding 4 is ultrasonic-heated and welded to the underlying filler pad 2 at discrete welding portions 4b. The wadding 4 is the same one as used in an ordinary seat cushion covered with a sewed cloth cover. The cushion body of FIG. 8 may be used as a substitute for the ordinary cloth cushion, and the former is less expensive, presenting a better pleasing appearance.

Thanks to the wadding 4 the surface of the filler pad 2 used need not be as smooth as the surface of the filler pad 2 used in the seat cushion of FIG. 5a, and a good elasticity is provided. The ordinary cloth seat cushion needs strings for binding the cushion to a seat frame, but the cushion of FIG. 8 needs no string. Slices of polyurethane may be put in between the surface layer 1 and the wadding 4 when occasions demand.

Figure 9A:
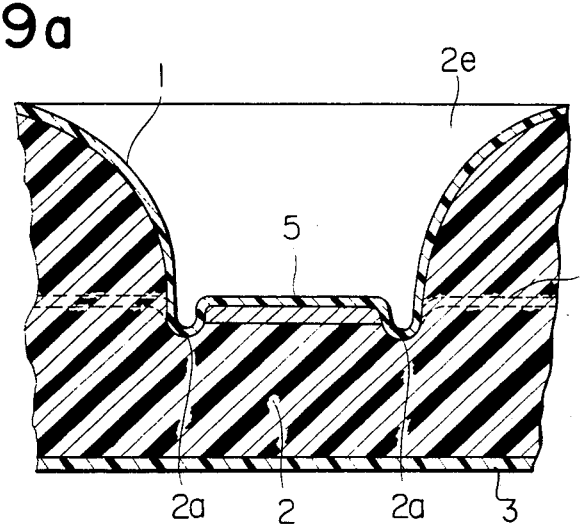
FIGS. 9a and 9b are schematic sectional views of tufted parts of fifth examples of cushion bodies with or without a wadding between a surface layer and a filler pad, made according to this invention.

FIG. 9a shows, in part, an embossed seat cushion as comprising a surface layer 1, a filler pad 2 and a backing layer 3. The surface layer 1 is ultrasonic-heated and welded to the underlying filler pad 2 around each disk or button 5 under the surface layer 1 as indicated at 2a. An ultrasonic welder used has a ring horn the diameter of which is somewhat larger than that of the disk. The broken line in FIG. 9a indicates the surface layer 1 which would be if inverted frustum recesses 2e were not made in the cushion body.

Figure 9B:
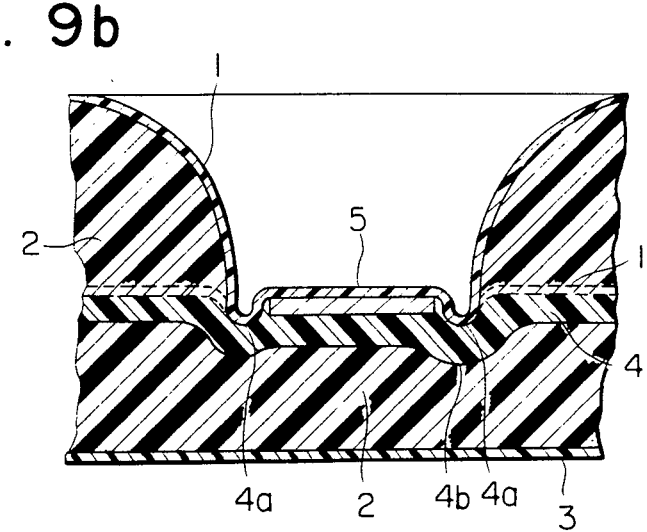

Also, in FIG. 9b the surface layer 1 is pushed around each of the underlying disks 5 with the ring horn of an ultrasonic welder, and then the surface layer 1 is welded under heat to the underlying wadding 4 at 4a and, at the same time, the wadding 4 is welded under heat to the underlying filler pad 2 at 4b.

Figure 10A:
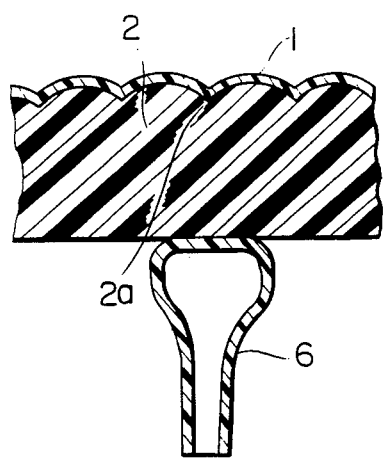
FIGS. 10a and 10b are schematic sectional views of parts of sixth examples of cushion bodies with or without a wadding between a surface layer and a filler pad, made according to this invention.
Figure 10B:
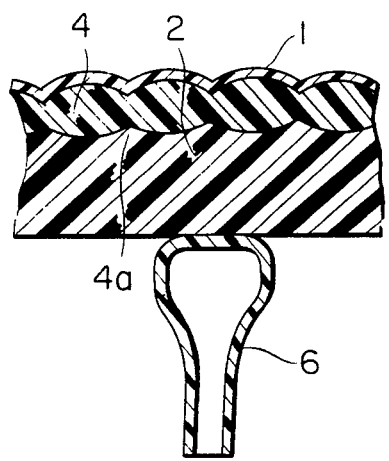

FIGS. 10a and 10b show seat cushions each equipped with a binding strap 6 at the side opposite to the surface layer 1 for the purpose of fixing the seat cushion to the seat frame or spring. The binding strap 6 is ultrasonic-welded to the bottom of the filler pad 2.

Figure 11A:
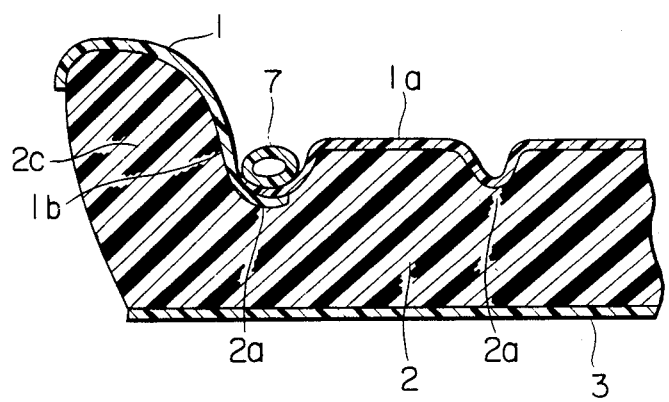
FIGS. 11a and 11b are schematic sectional views of parts of seventh examples of cushion bodies with or without a wadding between a surface layer and a filler pad, made according to this invention.

In a cushion body as shown in FIG. 11a a surface layer 1 is composed of a major or center part 1a and minor or margin parts 1b. As shown, the extensive center part and the narrow margin part are overlapped each other along each edge of the center part, and a bead 7 is put on these overlapping edges. Then, these are subjected together to the ultrasonic heating and welding as indicated at 2a.

Figure 11B:
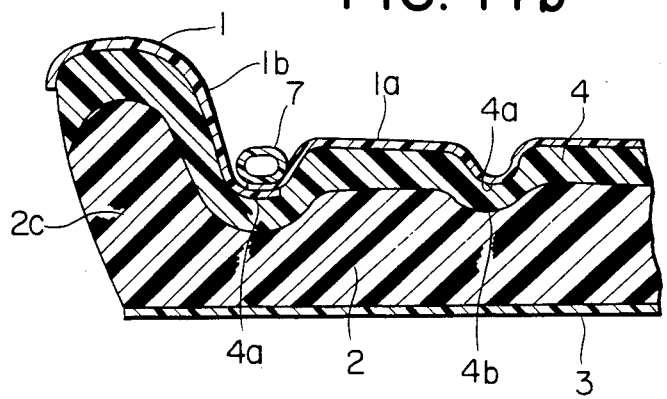

FIG. 11b shows a similar cushion body although it has a wadding 4 welded both to the overlying surface layer 1 and the underlying filler pad 2 at 4a and 4b respectively. Different-colored or -patterned center and margin parts may be combined to create a pleasing contrast is appearance. In case that a filler pad 2 has a rising hem 2c, it is advantageous to cut and fit the margin part to the shape of the rising hem 2c prior to ultrasonic welding. However, if the hem 2c does not rise to a relatively high level, the margin parts 1b need not be used, and then a single surface layer may suffice.

The cushion bodies of FIGS. 5-11 are described as having a preshaped bulky piece of polyurethane. Foamed polyurethane slabs may be laid on each other to foam a desired shape of lamination, and may be used as a filler pad.

Different cushion materials other than polyurethane may be used if these materials are weldable under the influence of ultrasonic wave.

In place of the backing layer 3 in the cushion bodies of FIGS. 5, 8, 9 and 11, for instance a hardboard may be attached to the bottom of the filler pad and then the hardboard-backed cushion body may be applied to the inside of a car, for instance the car door for decorative purpose.

A surface layer may be welded or glued to a wadding or filler pad material, and then the surface layer-coated material may be formed in a desired shape under the influence of ultrasonic wave.

Although not shown in the drawings, a thin cushion body may be produced by sandwiching a thin filler pad between a surface layer and a backing layer and by welding the backing layer almost directly to the surface layer. When a skinned polyurethane filler pad is used, the thin skin coating of the filler pad will be destroyed under the influence of ultrasonic wave, and then the polyurethane will be welded directly to the overlying surface layer. A laminated polyurethane sheet may be used as a surface layer.

The welding depth of the surface layer into the underlying material depends on the force with which an ultrasonic welder horn is pushed against the surface layer, the length of time for which the ultrasonic welding is performed and other operating factors.

Even if a surface layer is made of a material which is difficult to be welded by dielectric heating, or is easy to be spoiled by sparks due to electric current of high frequency, such surface layer may be often used without trouble thanks to the use of the ultrasonic welding method. Still advantageously ultrasonic welding of synthetic resins is effective to reduce the production cost, and yield products of ever quality and pleasing appearance.

What is claimed is:

1. A method of making a cushion body of synthetic resin comprising the steps of:
    (a) laying at least a surface layer and a preshaped filler pad on each other;
    (b) pressing the laminated structure at selected areas with a force insufficient to greatly reduce the thickness of the preshaped filter pad; and
    (c) subjecting the selected areas of the laminated structure to ultrasonic heating and welding, thereby forming the laminated structure into a desired shape, and wherein said step (a) includes putting disks between the surface layer and the underlying layer, and said step (c) includes pushing the ring horn of an ultrasonic welder on said surface layer around each disc area.

2. A method of making a cushion body of synthetic resin according to claim 1
    wherein said surface layer is composed of a major center part and minor margin parts, and wherein said step (a) includes overlapping these major and minor parts and putting a bead on each overlapping portion, and said step (c) includes pushing the horn of an ultrasonic welder against said bead and said overlapping portion to weld them together.

3. A method of making a cushion body of synthetic resin according to claim 2 wherein said filler pad is made of a foamed polyurethane with or without a skin coating thereon.

* * * * *